United States Patent Office 2,921,038
Patented Jan. 12, 1960

2,921,038
PROCESS FOR TREATING RUBBER-COVERED NYLON FIBER

Arnold Gunther, Buenos Aires, Argentina, assignor, by mesne assignments, to Samuel Lipetz and Alexander Lipetz, both of New York, N.Y.

No Drawing. Application March 17, 1955
Serial No. 495,066

1 Claim. (Cl. 260—2.3)

The present invention is a process designed to separate and to reclaim in a practically clean, reusable condition both the nylon fiber and the unvulcanized rubber contained in scrap of rubber-covered nylon fiber.

The economic value of this invention lies in the fact that prices for clean nylon fiber are high, while cost of scrap material is very low.

No standard method of separation, such as the solution of the rubber and subsequent separation of the remaining fiber from the solution by use of the known solvents for unvulcanized rubber, gives a nylon fiber so free of rubber that it can be reused in industry. Even with several washings of the remaining fibers in fresh portions of the solvent at high or low temperatures, it is impossible to free the fibers of rubber films, as is essential for any subsequent utilization; therefore, the purpose of this invention is to provide a method to obtain nylon fibers completely free of rubber impurities.

In the following, there is described in general terms the steps of the process of the present invention:

The raw material (scrap) is first dissolved in a solvent for unvulcanized rubber. Any of the following list of solvents can be used, as derivatives of petroleum, benzene and its homologues, such as toluene and xylene, chlorinated derivatives of methane, such as carbon tetrachloride, dichloro-ethylene, etc.

The major portion of the rubber covering the fibers is dissolved and is then separated from the fibers by filtration, decantation, centrifuging, or other means.

The fibers are again treated with fresh solvent and the rubber solution is again separated from the fibers. After several treatments, no more rubber can be extracted from the fibers because the solvent cannot remove any more.

The solvent absorbed by the fibers is evaporated, through heating the fibers by ordinary means such as steam heating; the solvent vapors are carried off, then condensed, whereby the solvent contained in the fibers is recuperated. The fibers, now free from solvent, are still covered with rubber impurities.

Next, the fibers are immersed in an aqueous solution of an oxidizing agent such as sodium hypochlorite, calcium hypochlorite (bleaching powder), hydrogen peroxide, etc.

After a few hours of immersion, the fibers are separated from the liquid by any convenient means, such as decantation or filtration. The fibers, together with water, are put in a ball mill which consists of a rolling barrel, lined with some bleach-liquor-resistant material such as silica. It has several moving balls of a material similar to that of the lining, which are displaced continuously by rotation of the barrel.

In course of time, the mechanical action of the balls on the fibers and of the fibers among themselves, removes all impurities from the fibers, leaving them in the water. The (remaining) cloudy water is eliminated; the fibers are separated from the above-mentioned balls and submitted to repeated washing in fresh water in order to remove the last traces of the oxidizing agent previously used. The fibers are then dried by adequate means, such as hot air, and they are now completely pure.

The reclaiming of the rubber is accomplished by evaporating the solvent from the rubber solution.

It should be mentioned that a ball mill is not indispensable and that any other mechanism for mutual displacement of the fibers can be used.

The following is a concrete example of the process of the present invention:

100 grams rubber-fiber scrap were immersed in 1000 grams of carbon tetrachloride and agitated for about three hours. The major part of rubber accompanying the fibers was dissolved in the solvent. The fibers were separated from the solution by filtration. The remaining fibers, still embedded (covered) with the rubber solution, were immersed in about 300 grams of fresh carbon tetrachloride and agitated again for about two hours.

Almost all the rubber still contained in the fibers went into solution in the solvent, which was again separated from the fibers by filtration. The fibers were again treated with about 300 grams of fresh solvent and after two hours of agitation, they were separated from the solution by filtering. The solvent was then evaporated from the fibers by evaporation with steam. The solvent-free fibers were then immersed for 12 hours in an aqueous solution of sodium hypochlorite that contained about 6 grams of available oxygen.

The fibers were separated from the aqueous solution by decantation, then put into a mortar containing some water and subjected to rubbing. After a short time, the water became dirty because of the passage of the remaining rubber impurities from the fibers into the water. The dirty solution was decanted off, and the remaining fibers were washed a few times with water until no reaction of hypochlorite was found in the wash water. This was ascertained by soaking in the wash water a starched paper (treated) with potassium iodide. The absence of a blue color on the paper indicated the end of the operation.

Finally, the fibers were dried by evaporating the water contained in them. The rubber was recovered from the solution by evaporating the solvent with steam in order to keep the boiling temperature low (about 70° C.), and thus prevent incipient vulcanization of the rubber.

The foregoing example is given by way of illustration only and not by way of limitation of the scope of protection of the invention, which is defined in the appended claim.

I claim:

An integrated, multi-stage, non-destructive process for reclaiming nylon fiber in reusable form from scrap material comprising nylon fiber covered with unvulcanized rubber, which comprises the steps of: immersing a batch of the scrap material in a selective solvent for the unvulcanized rubber and thereby dissolving rubber thereon; separating the rubber solution obtained after such immersion from the nylon fiber; repeating said alternate immersion and separation steps until no further rubber is extracted from the nylon fiber by such treatment; contacting the so-treated nylon fiber with steam to evaporate and remove from the nylon fiber any residual solvent absorbed thereon; immersing the solvent-free nylon fiber in an aqueous solution of an oxidizing agent selected from the group consisting of sodium hypochlorite, calcium hypochlorite and hydrogen peroxide for a time sufficient to substantially completely remove any residual matter adhering to the fiber and thereby permit subsequent separation by mechanical means of the nylon fiber from said residual matter; removing the nylon fiber from said oxidizing bath and wetting the same with water; mechanically beating the wetted fibers to float the nylon fiber free from residual rubber adhering thereto; recovering the nylon fiber, and washing and drying the recovered clean, rubber-free, reusable nylon fiber.

References Cited in the file of this patent

UNITED STATES PATENTS

| | | |
|---|---|---|
| 2,260,367 | Dubeau et al. | Oct. 28, 1941 |
| 2,284,549 | Yablonski | May 26, 1942 |

FOREIGN PATENTS

| | | |
|---|---|---|
| 356,519 | Great Britain | Sept. 10, 1931 |
| 839,597 | France | Apr. 6, 1939 |

OTHER REFERENCES

The India-Rubber Journal, March 14, 1942, page 719, by C. M. Blow.